United States Patent
Chethik et al.

[19]

[11] Patent Number: 5,898,737
[45] Date of Patent: Apr. 27, 1999

[54] ADAPTIVE DIGITAL SYMBOL RECOVERY FOR AMPLITUDE PHASED KEYED DIGITAL COMMUNICATION SYSTEMS

[75] Inventors: Frank Chethik; Richard Koralek, both of Palo Alto; Donald R. Pandori, San Jose; Francis J. Smith, Livermore, all of Calif.

[73] Assignee: Lockheed Martin Corporation, Bethesda, Md.

[21] Appl. No.: 08/543,814

[22] Filed: Oct. 16, 1995

[51] Int. Cl.$^6$ ............................. H03H 7/30; H04L 23/02
[52] U.S. Cl. ......................... 375/235; 375/261; 375/326; 375/322
[58] Field of Search ...................... 375/232, 235, 375/261, 322, 325, 340, 345, 350, 326, 327; 329/304, 307

[56] References Cited

U.S. PATENT DOCUMENTS

| | | | |
|---|---|---|---|
| 5,264,937 | 11/1993 | Christopher | 375/261 |
| 5,315,617 | 5/1994 | Guida et al. | 375/261 |
| 5,347,569 | 9/1994 | Yamamoto | 375/261 |
| 5,563,916 | 10/1996 | Scarpa | 375/345 |
| 5,671,253 | 9/1997 | Stewart | 375/345 |

*Primary Examiner*—Don N. Vo
*Attorney, Agent, or Firm*—Kenneth W. Float

[57] ABSTRACT

Improvements to amplitude phased keyed digital communications systems and to the processing of amplitude phase keyed symbols transmitted over radio frequency channels. The present invention provides for an amplitude phased keyed digital communications system including an adaptive baseband equalizer, a digital symbol recovery circuit in accordance with the present invention, and a quadrature demodulator. The adaptive baseband equalizer receives amplitude phased keyed signals and outputs in-phase and quadrature digital amplitude values corresponding to the received amplitude phased keyed signals. The digital symbol recovery circuit comprises a programmable addressable random access memory that stores a plurality of eight bit words comprising decoded symbol sets of the received amplitude phased keyed signals, and outputs the decoded symbol sets in response to addresses corresponding to the in-phase and quadrature output signals. The quadrature demodulator processes the decoded symbol sets and outputs recovered amplitude phased keyed symbols corresponding to the received amplitude phased keyed signals. Eight bit I and Q amplitude values address 256×256 memory locations in the memory of the digital symbol recovery circuit. For example, at each memory location, a seven bit word, for example, is stored. The first four bits define a 4-tuple for the decoded symbol. The fifth bit is a bang-bang phase bit or carrier tracking bit. The sixth bit is a bang-bang automatic gain control bit. The seventh bit is a false lock indicator bit.

12 Claims, 3 Drawing Sheets

ADAPTIVE DIGITAL SYMBOL RECOVERY FOR AMPLITUDE PHASED KEYED DIGITAL COMMUNICATION SYSTEMS

BACKGROUND

The present invention relates to amplitude phased keyed communications systems, and more particularly, to an improved amplitude phased keyed digital symbol recovery circuit for use in an amplitude phased keyed digital communications system.

In conventional communication systems, adaptive digital symbol recovery is performed by analog threshold processing of I and Q baseband signals. Any signal can be decomposed into orthogonal signals comprising in-phase (I) and quadrature (Q) signals. In amplitude phase keyed (APK) communications signals, the transmitted symbols arc typically recovered via sum and difference circuits operating on the orthogonal signals at baseband. With the knowledge of the amplitude of each of the signals at the correct sample times, amplitude phase keyed symbols can be recovered. However, conventional communication systems are not expandable nor programmable. Conventional communication systems typically do not process a very wide variety of signal constellations and cannot be programmed to process new signal constellations using only a memory upload sequence.

False lock detection is conventionally done by monitoring the bit error rate of the system, which typically involves the use of added circuitry. Therefore, false lock detection is relatively complex and costly to implement. Carrier lock status is conventionally implemented using a complex circuit configuration, and is also relatively costly to implement.

Therefore, it is an objective of the present invention to provide for an amplitude phased keyed digital communications system having an improved digital symbol recovery circuit. It is a further objective of the present invention to provide for an amplitude phased keyed digital communications system having an improved digital symbol recovery circuit that is programmable and expandable and that provides a means for cost-effectively implementing carrier tracking and recovery and false lock detection, automatic gain control and that is capable of processing a wide variety of signal constellations using only a memory upload sequence to adapt to the new signal constellation.

SUMMARY OF THE INVENTION

To meet the above and other objectives, the present invention provides for improvements to amplitude phased keyed (APK) digital communications systems and to the processing of amplitude phase keyed symbols transmitted over radio frequency channels. The present invention provides for an amplitude phased keyed digital communications system including an adaptive baseband equalizer, a digital symbol recovery circuit in accordance with the present invention, and a quadrature demodulator. The adaptive baseband equalizer receives amplitude phased keyed signals and outputs in-phase (I) and quadrature (Q) digital amplitude values corresponding to the received amplitude-phased keyed (APK) signals. The digital symbol recovery circuit comprises a programmable addressable random access memory that stores a plurality of eight bit words comprising decoded symbol sets of the received amplitude phased keyed signals, and outputs the decoded symbol sets in response to addresses corresponding to the I and Q output signals. The quadrature demodulator processes the received passband symbols and outputs digital words representing recovered APK I and Q baseband signals corresponding to the received amplitude phased keyed symbols in the radio frequency (RF) channel.

One aspect of the present invention is that I and Q signals are sampled at the symbol centers and then quantized. The digital amplitudes of the I and Q signals are input to a digital symbol recovery circuit. The digital symbol recovery circuit is programmable and adaptable to channel distortions, providing programmable adaptable decision regions that optimize symbol recovery and minimize bit error rates.

The digital symbol recovery circuit processes digital (quantized) versions of the analog I and Q component signal voltages The digital symbol recovery decision regions and thresholds of separation are fully programmable (memory uploadable). The digital symbol recovery decision boundaries are adaptable to conform to the distortion characteristics of a given communications channel. The digital symbol recovery circuit supports digital automatic phase control (APC) boundary decisions for carrier recovery, digital automated gain control (AGC), and digital false lock detection data. The fully programmable symbol recovery circuit may be used to process any of a large class of APK signals and can be optimized for the distortions of a given channel.

Another aspect of the present invention is that, for each symbol received, the digital symbol recovery circuit outputs a 1-bit quantized (bang-bang) phase error bit to a quadrature demodulator indicating whether the phase of the received signal is ahead of or lagging the estimated phase. This programmable capability drives a bang-bang phase lock loop in the quadrature demodulator to provide coherent carrier tracking and recovery. The circuit processes multiple amplitude signals as well as constant envelope signals.

Because the present invention is programmable, AGC false-lock signals may be provided as output signals therefrom by means of a simple and highly accurate implementation of the digital symbol recovery circuit. False lock detection is conventionally done by monitoring the bit error rate of the communication system.

Another aspect of the present invention is that, if the bang-bang phase lock loop is in false lock, the bang-bang phase bit for certain predeterminable points in the constellation will be predominantly 0's or 1's. False lock detection in conjunction with digital symbol recovery provided by the present circuit provides the programmable capability to monitor any selected constellation points and use the bang-bang phase bit to determine false lock. Monitoring a given constellation allows the bang-bang phase bit decision to drive the bang-bang phase lock loop in a direction required to correct the lock state. The bang-bang phase lock loop may encounter additional false lock states on the way to the correct lock state, but the process is repeated until the correct lock state is achieved.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
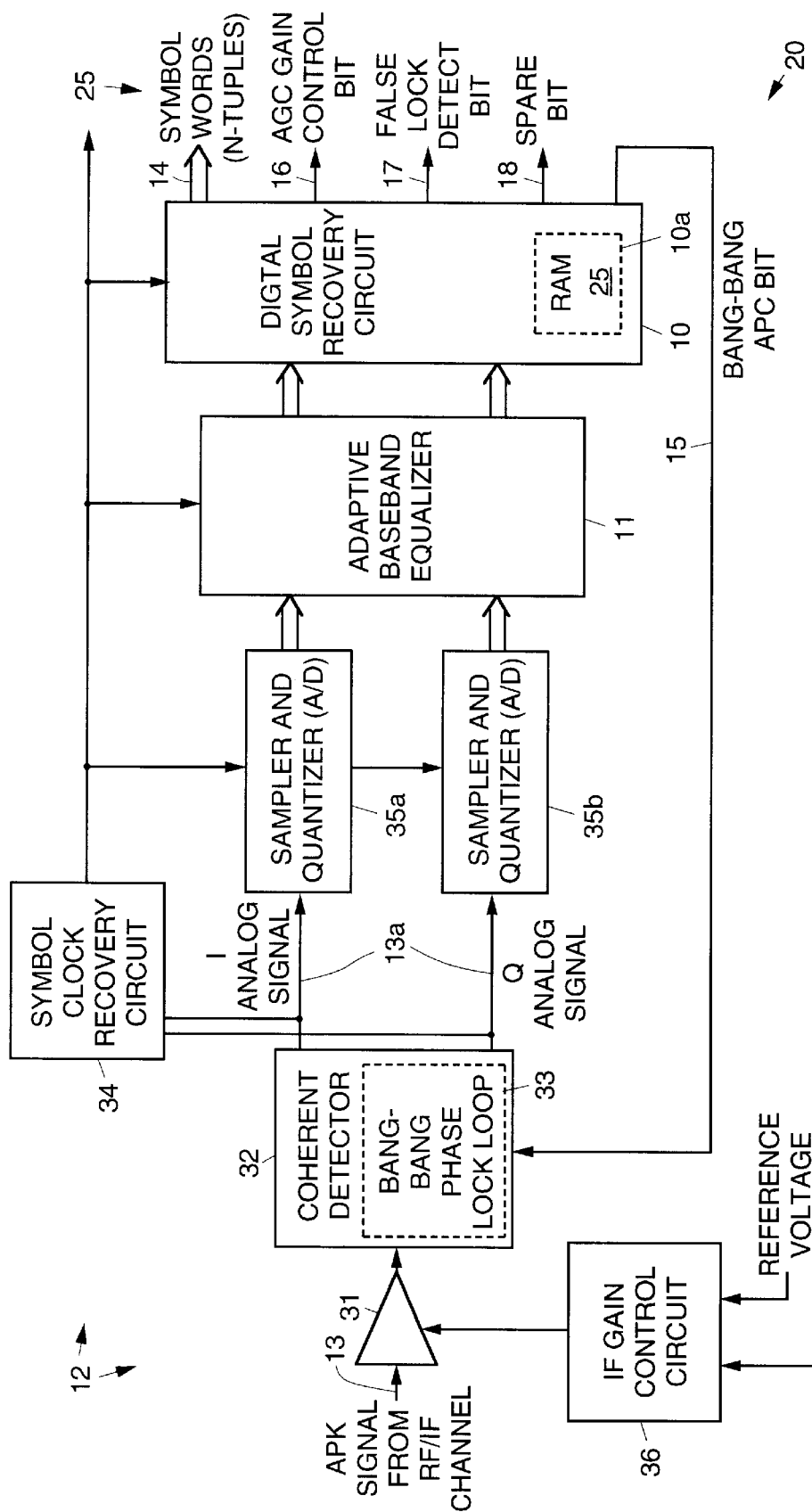
FIG. 1 illustrates an amplitude phased keyed digital symbol recovery circuit in accordance with the principles of the present invention for use with an amplitude phased keyed digital communications system.
Figure 2:
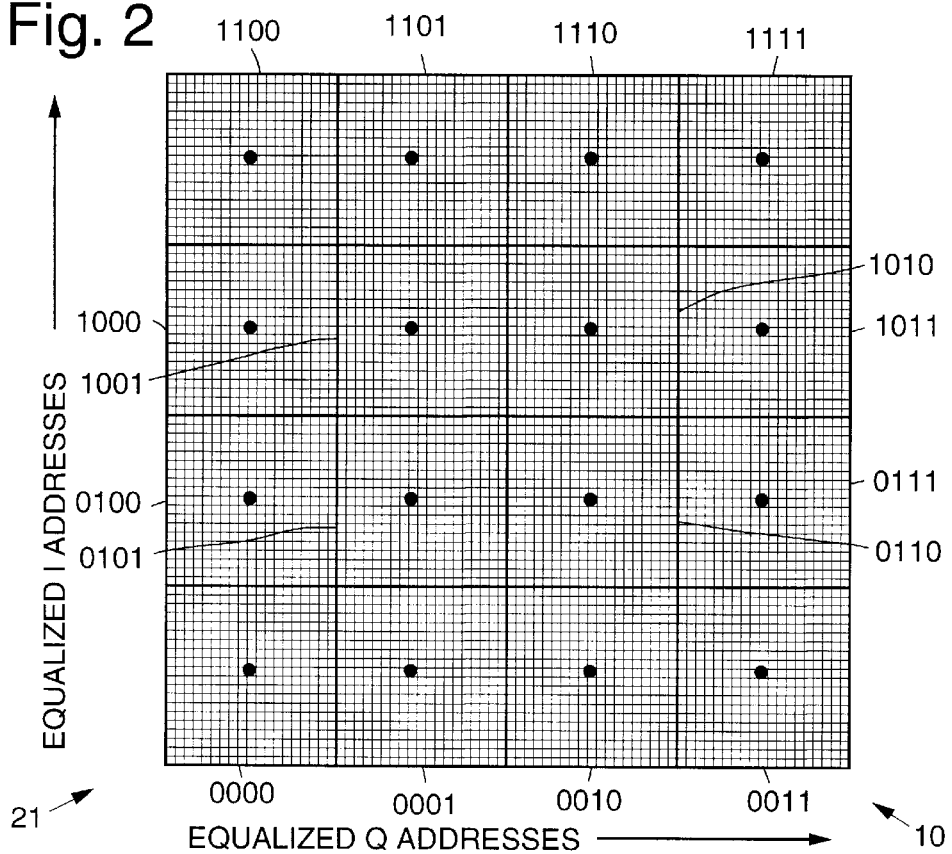
FIG. 2 illustrates a 16 QAM symbol map that may be employed in the digital symbol recovery circuit of FIG. 1.
Figure 3:
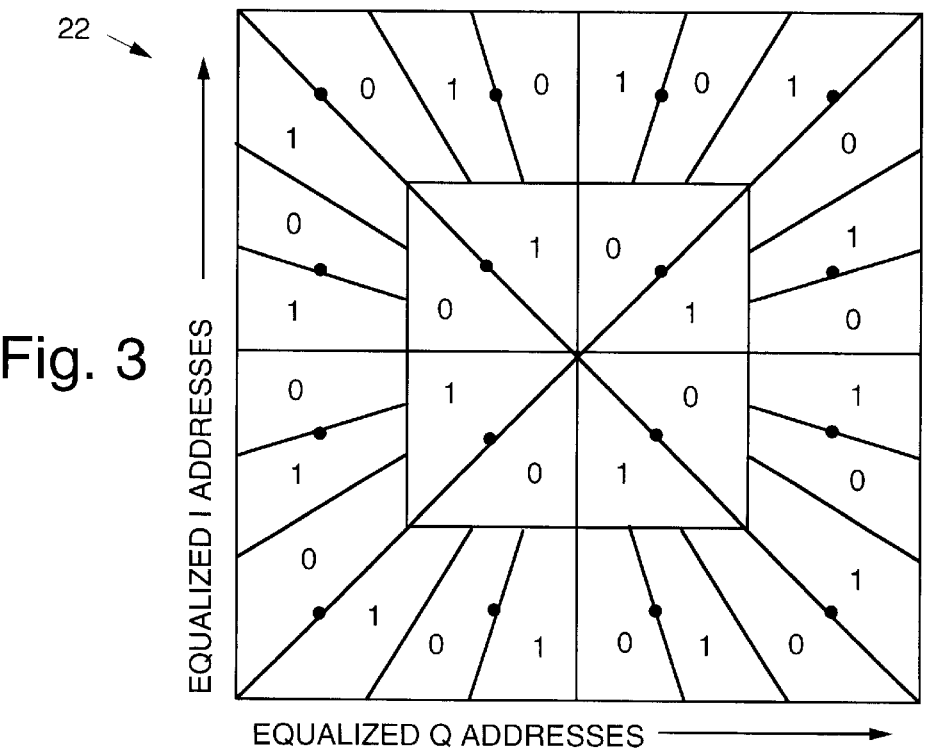
FIG. 3 illustrates a carrier tracking bang-bang servo map that may be employed in the digital symbol recovery circuit of FIG. 1.
Figure 4:
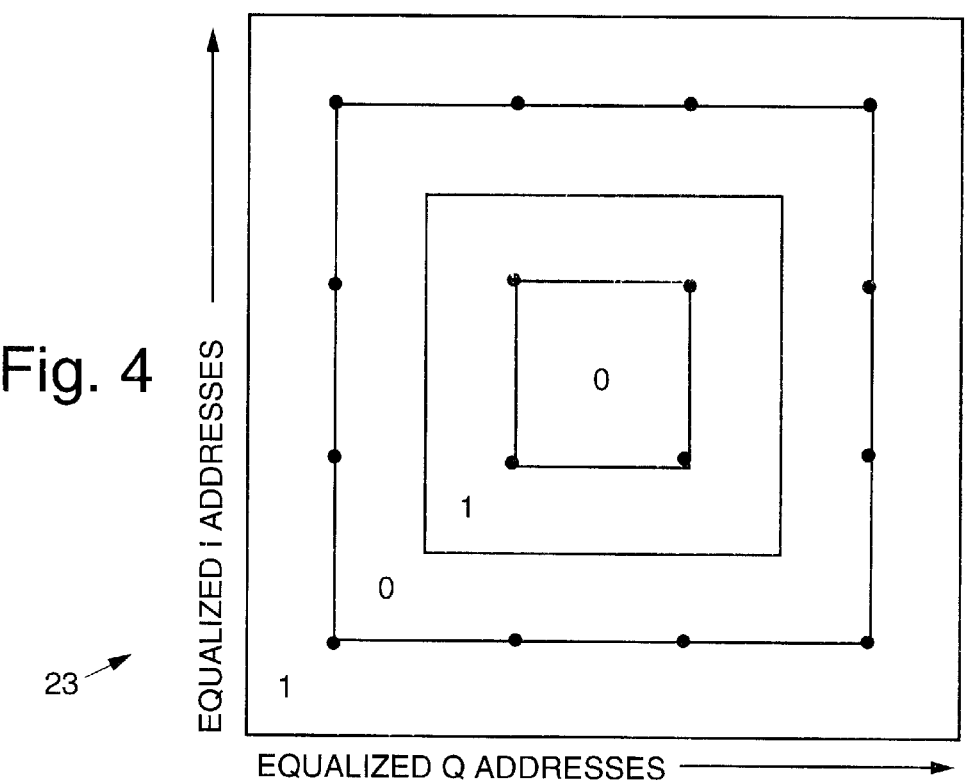
FIG. 4 illustrates a 16 QAM automatic gain control map that may be employed in the digital symbol recovery circuit of FIG. 1.
Figure 5:
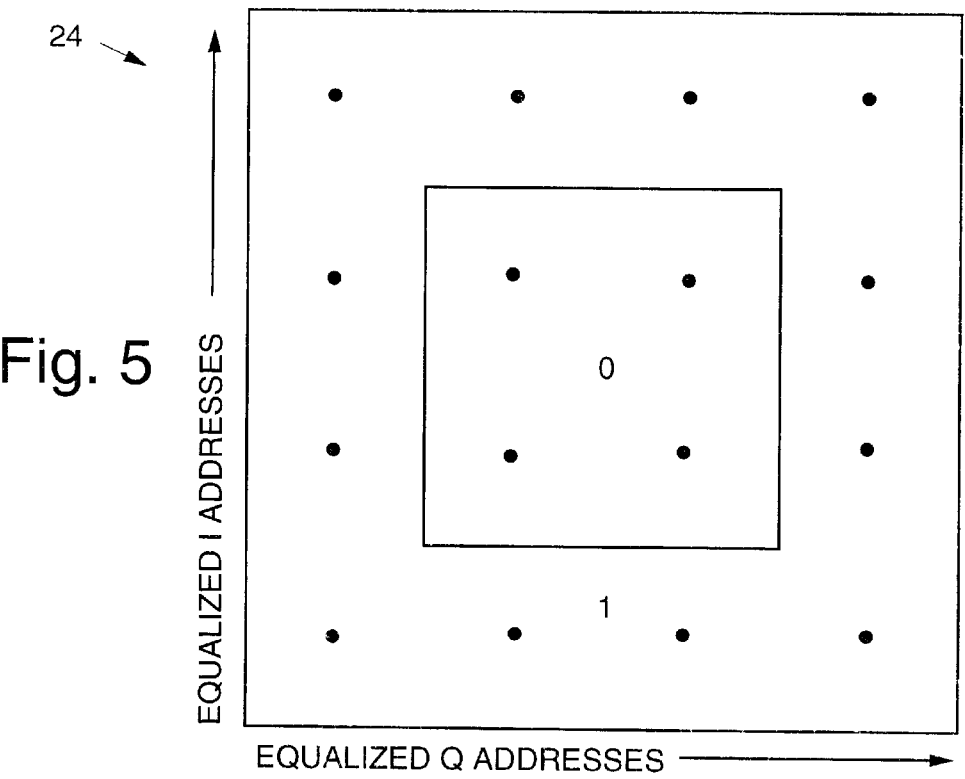
FIG. 5 illustrates a false lock detection map that may be employed in the digital symbol recovery circuit of FIG. 1.

Referring to the drawing figures, FIG. 1 illustrates an amplitude phased keyed digital symbol recovery circuit 10 in accordance with the principles of the present invention employed with an amplitude phased keyed digital communications system 20. FIG. 2 illustrates a 16 QAM symbol map 21 employed in the digital symbol recovery circuit 10 of FIG. 1. FIG. 3 illustrates a carrier tracking bang-bang servo map 22 employed in the digital symbol recovery circuit 10 of FIG. 1. FIG. 4 illustrates a 16 QAM automatic gain control map 23 employed in the digital symbol recovery circuit 10 of FIG. 1. FIG. 5 illustrates a false lock detection map 24 employed in the digital symbol recovery circuit 10 of FIG. 1.

A portion of the amplitude phased keyed digital communications system 20 is shown in FIG. 1 and comprises an adaptive baseband equalizer 11, the present digital symbol recovery circuit 10, and a quadrature demodulator 12. The quadrature demodulator 12 is comprised of an amplifier 31, for receiving amplitude phased keyed signals 13 or symbols 13, a coherent detector 32 comprising a bang-bang phase lock loop 33, a symbol clock recovery circuit 34, I and Q sampler and quantizer circuits 35a, 35b, and an IF gain control circuit 36. The IF gain control circuit 36 has a reference voltage applied thereto and a bang-bang phase bit 15 derived from the digital symbol recovery circuit 10.

The digital symbol recovery circuit 10 is a programmable (memory uploadable) circuit 10 that makes symbol decisions in the I-Q plane for received signals containing a wide class of amplitude phase keyed (APK) modulations. The architecture of the digital symbol recovery circuit 10 comprises a large addressable random access memory 10a (RAM look-up table 10a) whose memory contents are addressed by 8 bit quantized I and Q digital amplitude values 13a of received amplitude phased keyed signals 13 or symbols 13.

In a reduced to practice embodiment of the present invention, the addressable memory 10a has 256×256 (64K) locations (illustrated in FIG. 2). Each memory location stores an 8 bit word 25 that contains the decoded symbol "n-tuple" 14 corresponding to the received amplitude phased keyed signals 13.

By way of example, in the case of a 16-ary (i.e. 16 QAM) signal 13, four bits (4-tuples) define each of 16 possible amplitude phased keyed (APK) symbol states. In this case, four bits are read out from the digital symbol recovery circuit 10 (memory 10a) and a symbol decision is made. Additional bits are available for larger APK symbol sets (n-tuples), such as 64 (6-tuples), 256 (8-tuples), 1024 (10-tuples) APK, etc., communications signals.

This aspect of the present invention provides for expansion of the addressable memory locations in the memory 10a and the size of the digital words 25 stored at each location from 8 bits to a word size required to recover higher order APK signal symbols 13. In addition, extra bits are available for determining whether the phase sample of a phase tracking coherent detector (not shown) lags or leads the estimated phase state shown in FIG. 3. This datum facilitates "bang-bang" phase lock loop tracking of the complex APK received sequence and comprises the bang-bang phase bit 15 or automated phase control bit 15 (APC-bit) shown in FIGS. 1 and 3. An additional bit determines whether of the amplitude of the received symbol 13 is greater or smaller than the ideal amplitude of the symbol 13. This is an automatic gain control bit 16 (AGC-bit) shown in FIG. 4. For each symbol decision region shown in the false lock detection map 24 shown in FIG. 5, an additional bit is designated as a "false lock detect"indicator bit 17. The false lock detect bit 17 shown in FIG. 5 facilitates suppression of false lock modes that are encountered in the bang-bang phase tracking system.

Since the 256×256 memory locations of the random access memory are programmable (memory uploadable), decision regions for the recovered symbols 13 may be arbitrarily changed. The decision regions may be redefined for other APK symbol structures such as 8 PSK, 12, 4 APK, 64 QAM or many others. Additionally, for any given symbol structure, the decision regions in the memory 10a of the digital symbol recovery circuit 10 may be optimized to provide a minimum probability of symbol decision error, by statistically analyzing the received samples in I-Q space, and thereby adapting system 20 for near optimum performance in a particular distorting channel environment.

By way of example, for a 16-ary APK waveform, the digital symbol recovery circuit 10 receives digital I and Q amplitude values 13a from an adaptive baseband equalizer 11. The 8-bit I and 8-bit Q amplitude values 13a address 256×256 memory locations (64K) in the memory 10a of the digital symbol recovery circuit 10. At each memory location, a 7 bit word 25, for example, is stored. This may be expanded to larger words for more complex constellations. In the 16-ary APK example, the first four bits define a 4-tuple 14 for the decoded symbol 13. This is only in the instance of 16-ary APK waveforms. For 8-ary APK, 3 bits represent the decoded symbol. for 64-ary, 6 bits represent the decoded symbol. The fifth bit is the bang-bang phase error bit 15 or carrier tracking bit 15. The sixth bit is the bang-bang AGC error bit 16. The seventh bit is the false lock indicator bit 17.

Any signal 13 may be decomposed into orthogonal signals comprising in-phase (I) and quadrature (Q) signals 13a. For amplitude phase keyed communications (APK) signals, using knowledge of the amplitude of each of the signals 13a at the correct sample times, amplitude phase keyed symbols 13 are recovered. In the present system 20, the I and Q signals 13 are digitally sampled at centers of the symbol 13a by I and Q sampler and quantizer circuits 35a, 35b, and the digital amplitudes of the I and Q symbols 13 are input to the digital symbol recovery circuit 10. For each received symbol 13, the digital symbol recovery circuit 10 outputs the AGC bit 16 to the quadrature demodulator 12 indicating whether the amplitude of the received signal 13 was above or below an ideal amplitude. This programmable capability drives an AGC bang-bang circuit (not shown) in the quadrature demodulator 12 to provide highly accurate gain control. The bang-bang bit stream (bits 14–18) is low pass filtered in the quadrature demodulator 12 and the bang-bang AGC loop is closed.

An additional bit (the false lock bit 17) in each memory location is coded with a "0" or a "1" depending on whether that point in the constellation is to be used as a false lock detection point. FIG. 3 shows the bang-bang carrier tracking map 22. FIG. 4 shows the AGC map 23. FIG. 5 shows the false lock detect map 24. For all points designated as "false lock detection points", the bang-bang phase bits 15 are monitored to determine if there is a predominance of 0's or 1's. If a programmable ratio of 0's or 1's is exceeded, the bang-bang phase locked loop is driven with either 0's or 1's by a programmable distance to approach the correct lock position. If another false lock condition is encountered, the process in repeated until correct lock is achieved.

Thus there has been described a new and improved amplitude phased keyed digital communications system comprising an improved digital symbol recovery circuit. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A amplitude phased keyed digital communications system comprising:
    a quadrature demodulater for receiving amplitude phased keyed signals and for generating in-phase and quadrature baseband signals;
    an adoptive baseband equalizer for prossesing the respective in-phase and quadrature basesband signals therefrom; and
    a digital symbol recovery circuit comprising a programmable addressable random access memory coupled to the adaptive baseband equalizer for storing a plurality of multi-bit words comprising decoded symbol sets of the received amplitude phased keyed signals, and for outputting the decoded symbol sets in response to addresses corresponding to the equalized complex in-phase and quadrature output signals received thereby;
    wherein one bit of each word comprises a bang-bang signal amplitude error sign bit to facilitate automatic gain control signal normalization.

2. The system of claim 1 wherein one bit of each word comprises a bang-bang phase error sign bit to facilitate coherent signal detection.

3. The system of claim 1 wherein K bits define each of $2^k$ possible amplitude phased keyed (APK) symbol states, and wherein K bits of each word are read out from the digital symbol recovery circuit and a symbol decision is made.

4. the system of claim 1 wherein one bit of each word comprises a false lock detect bit to facilatate resolution of ambigious coherent detector system lock states.

5. The system of claim 1 wherein one of the false lock detect bit is coded with a "0" or a "1" depending on whether that point is to be used as a false lock detection point, and for all points designated as false lock detection points, the bang-bang phased bits are monitored to determine if there is a predominance of 0's or 1's, and if a programmable ratio of 0's or 1's is exceeded, the phase locked loop is driven with 0's or 1's to approach a correct lock position.

6. An amplitude phased keyed digital communications system comprising:
    a quadrature demodulator for receiving amplitude phased keyed signals and for generation in-phase and quadrature baseband signals;
    an adaptive baseband equalizer for processing the respective in-phase and quadrature baseband signals to produce and equalized complex in-phase and quadrature baseband signals as output signals therefrom; and
    a digital symbol recovery circuit comprising a programmable addressable random access memory coupled to the adaptive baseband equalizer for storing a plurality of multi-bit words comprising decoded symbol sets of the received amplitude phased keyed signals, and for outputting the decoded symbol sets in response to addresses corresponding to the equalized complex in-phase and quadrature output signals received thereby;
    wherein one bit of each word comprises a bang-bang signal amplitude error sign bit to facilitate automatic gain control signal normalization; and
    wherein one bit of each word comprises a band-bang phase error sign bit to facilitate coherent signal detection.

7. The system of claim 6 wherein K bits define each of $2^K$ possible amplitude phased keyed (APK) symbol states, and wherein K bits of each word are read out from the digital symbol recovery circuit and a symbol decision is made.

8. The system of claim 6 wherein one bit of each word comprises a false lock detect bit to facilitate resolution of ambiguous coherent detector system lock states.

9. The system of claim 6 wherein one of the false lock detect bit is coded with a "0" or a "1" depending on whether that point is to be used as a false lock detection point, and for all points designated as false lock detection points, the bang-bang phase bits are monitored to determine if there is a predominance of 0's or 1's, and if a programmable ratio of 0's or 1's is exceeded, the phase locked loop is driven with 0's or 1's to approach a correct lock position.

10. An amplitude phased keyed digital communications system comprising:
    a quadrature demodulator for receiving amplitude phase keyed signals and for generating in-phase and quadrature baseband signals;
    an adaptable gas band equalized complex in-phase and quadrature gas band signals as output signals therefrom; and
    a digital symbol recovery circuit comprising a programmable addressable random access memory coupled to the adaptive baseband equalizer for storing a plurality of multi-bit words comprising decided symbol sets of the received amplitude phased keyed signals, and for outputting the decoded symbol sets in response to addresses corresponding to the equalized complex in-phase and quadrature output signals received thereby;
    wherein one bit of each word comprises a bang-bang signal amplitude error sign bit to facilitate automatic gain control signal normalization;
    wherein one bit of each word comprises a bang-bang phase error sign bit to facilitate coherent signal detection; and
    wherein one bit of each word comprises a false lock detect bit to facilitate resolution of ambiguous coherent detector system lock states.

11. The system of claim 10 wherein K bits define each of $2^K$ possible amplitude phased keyed (APK) symbol states, and wherein K bits of each word are read out from the digital symbol recovery circuit and a symbol decision is made.

12. The system of claim 10 wherein one of the false lock detect bit is coded with a "0" or a "1" depending on whether that point is to be used as a false lock detection point, and for all points designated as false lock detection points, the bang-bang phase bits are monitored to determine if there is a predominance of 0's or 1's, and if a programmable ratio of 0's or 1's is exceeded, the phase locked loop is driven with 0's or 1's or 1's to approach a correct lock position.

* * * * *